(12) United States Patent
Hayashi et al.

(10) Patent No.: US 9,118,068 B2
(45) Date of Patent: Aug. 25, 2015

(54) LAYERED SOLID-STATE BATTERY

(71) Applicant: MURATA MANUFACTURING CO., LTD., Nagaokakyo-Shi, Kyoto-Fu (JP)

(72) Inventors: Takeshi Hayashi, Nagaokakyo (JP); Masutaka Ouchi, Nagaokakyo (JP); Kunio Nishida, Nagaokakyo (JP); Makoto Yoshioka, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 13/762,439

(22) Filed: Feb. 8, 2013

(65) Prior Publication Data

US 2013/0149592 A1 Jun. 13, 2013

Related U.S. Application Data

(63) Continuation of application No. PCT/JP2011/067926, filed on Aug. 5, 2011.

(30) Foreign Application Priority Data

Aug. 9, 2010 (JP) .................................. 2010-178501

(51) Int. Cl.
| | |
|---|---|
| *H01M 2/20* | (2006.01) |
| *H01M 4/66* | (2006.01) |
| *H01M 10/04* | (2006.01) |
| *H01M 10/052* | (2010.01) |
| *H01M 10/0585* | (2010.01) |

(52) U.S. Cl.
CPC ................ *H01M 2/204* (2013.01); *H01M 4/66* (2013.01); *H01M 10/044* (2013.01); *H01M 10/052* (2013.01); *H01M 10/0585* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 2001/0049050 A1* | 12/2001 | Aragane et al. .................. | 429/62 |
| 2004/0091771 A1 | 5/2004 | Hosaka et al. | |
| 2007/0202414 A1* | 8/2007 | Yoshida et al. ............... | 429/304 |
| 2008/0311480 A1 | 12/2008 | Sano | |
| 2009/0197161 A1* | 8/2009 | Nakamura .................... | 429/158 |

(Continued)

FOREIGN PATENT DOCUMENTS

| | | |
|---|---|---|
| CN | 102388491 A | 3/2012 |
| CN | 102549808 A | 7/2012 |
| JP | 2001-015152 A | 1/2001 |
| JP | 2004-158222 A | 6/2004 |

(Continued)

OTHER PUBLICATIONS

PCT/JP2011/067926 Written Opinion dated Jul. 11, 2011.

*Primary Examiner* — Patrick Ryan
*Assistant Examiner* — Haixia Zhang
(74) *Attorney, Agent, or Firm* — Arent Fox LLP

(57) ABSTRACT

A layered solid-state battery that includes a first unit cell, a second unit cell, and an internal collection layer that is disposed to intervene between the unit cells. Each of the unit cells includes a positive electrode layer, a solid electrolyte layer, and a negative electrode layer that are sequentially stacked. The internal collection layer has one side surface that is in contact with the positive electrode layer of the first unit cell and the other side surface that is in contact with the negative electrode layer of the second unit cell. Also, the internal collection layer contains an electron conductive material and an ion-conductively insulating specific conductive material.

13 Claims, 6 Drawing Sheets

(56) References Cited

U.S. PATENT DOCUMENTS

2010/0297537 A1* 11/2010 Coors et al. .................. 429/532
2012/0034521 A1    2/2012 Matsuyama et al.
2012/0171549 A1    7/2012 Ouchi et al.

FOREIGN PATENT DOCUMENTS

| | | |
|---|---|---|
| JP | 2004-158343 A | 6/2004 |
| JP | 2008-027659 A | 2/2008 |
| JP | 2008-251219 A | 10/2008 |

* cited by examiner

LAYERED SOLID-STATE BATTERY

CROSS REFERENCE TO RELATED APPLICATIONS

The present application is a continuation of International application No. PCT/JP2011/067926, filed Aug. 5, 2011, which claims priority to Japanese Patent Application No. 2010-178501, filed Aug. 9, 2010, the entire contents of each of which are incorporated herein by reference.

FIELD OF THE INVENTION

The present invention generally relates to a layered solid-state battery, and specifically to a layered solid-state battery constructed so that unit cells are connected in series.

BACKGROUND OF THE INVENTION

In recent years, as a power supply of portable electronic equipment such as a portable phone or a portable personal computer, a battery, in particular a secondary battery, is used. As one example of a secondary battery, a lithium ion secondary battery is known to have a relatively large energy density. In such a secondary battery, a liquid electrolyte (electrolytic solution) of an organic solvent or the like is conventionally used as a medium for allowing ions to move. However, in a secondary battery using an electrolytic solution, there is a problem such as leakage of the electrolytic solution. Therefore, development of a layered solid-state battery in which all the constituent elements are constituted of solids using a solid electrolyte is being advanced.

As a structure of such a layered solid-state battery, Japanese Patent Application Laid-open (JP-A) No. 2004-158222 (hereafter referred to as Patent Document 1), for example, discloses a structure of a multi-layered battery in which battery cells, each of which is a thin-film solid-state lithium ion secondary battery, are stacked in plural stages.

In one structure disclosed in Patent Document 1, in a layered solid-state battery in which plural pieces of power-generating elements, each of which is constructed by stacking a positive electrode layer, a solid electrolyte layer, a negative electrode layer, and a collection layer, are stacked, the layers are sequentially stacked on one substrate by utilizing a function of the collection layer (metal film) serving as an ion-conductively insulating film, without using a new insulating layer between the individual power-generating elements.

In another structure disclosed in Patent Document 1, in a layered solid-state battery in which plural pieces of power-generating elements, each of which is constructed by stacking a positive electrode layer, a solid electrolyte layer, a negative electrode layer, and a collection layer, are stacked through the intermediary of an electron-conductively and ion-conductively insulating insulation layer, withdrawal tabs disposed on outer peripheral parts of the collection layers are disposed by being drawn out to the outside of the layered body perpendicularly to the layered body direction; via holes for connection penetrating through the insulation layer are provided in these withdrawal tabs; the via holes are made capable of embedding metal electrodes therein for connection; and connections of series type, parallel-type, and series-parallel-type can be selected by a combination of these connections.

Patent Document 1: Japanese Patent Application Laid-open (JP-A) No. 2004-158222

SUMMARY OF THE INVENTION

In the structure of one layered solid-state battery disclosed in Patent Document 1, the unit cells are electrically connected in series through the intermediary of the collection layer by disposing the positive electrode layer on one surface of the collection layer and disposing the negative electrode layer on the opposite surface. However, in this layered solid-state battery, when the positive electrode layer and the negative electrode layer are ion-conducted through the intermediary of the collection layer, only the positive electrode layer and the negative electrode layer that are ion-conducted are electrically discharged, thereby considerably deteriorating the battery characteristics of the layered solid-state battery. Also, in order to insulate the ion conductivity of the collection layer substantially, a devise such as making the collection layer into a poreless continuous film or sufficiently ensuring the thickness of the collection layer will be necessary. In the former case, it will be difficult to apply a technique such as the sputtering method generally used as a method of forming the collection layer or the screen printing method of an electrically conductive material. In the latter case, there arises a problem such that the amount of use of the electron-conductive material (metal paste or the like) constituting the collection layer will be large.

On the other hand, in the other layered solid-state battery disclosed in Patent Document 1, the unit cells are electron-conductively and ion-conductively insulated from each other by the insulation layer, and the unit cells are electrically connected in series and/or in parallel by the withdrawal tabs disposed on the outside of the unit cells. Since the insulating layer is used for electron-conductively and ion-conductively insulating the unit cells from each other, the positive electrode layer and the negative electrode layer are not ion-conductively conducted through the intermediary of the collection layer even if the collection layer substantially has ion conductivity. This makes it possible to prevent the battery characteristics of the layered solid-state battery from being deteriorated.

However, since the unit cells are electrically connected on the outside of the unit cells using the withdrawal tab disposed for each unit cell, approximately the same number of withdrawal tabs as the unit cells are needed. Also, the volume for disposing the withdrawal tabs is needed to be provided in the layered solid-state battery.

Therefore, an object of the present invention is to provide a layered solid-state battery in which, with a simple construction, a plurality of unit cells constituting the layered solid-state battery can be connected in series and in which the positive electrode layer and the negative electrode layer can be ion-conductively insulated in two unit cells that are adjacent to each other.

A layered solid-state battery in accordance with the present invention includes first and second unit cells and an internal collection layer that is disposed so as to intervene between the first and second unit cells. Each of the first and second unit cells is constituted of a positive electrode layer, a solid electrolyte layer, and a negative electrode layer that are sequentially stacked. The internal collection layer has one side surface that is in contact with the positive electrode layer of the first unit cell and the other side surface that is in contact with the negative electrode layer of the second unit cell. Also, the internal collection layer contains an ion-conductively insulating specific conductive material.

First, in the present invention, different poles are disposed on the two sides of the internal collection layer, so that a bipolar layered solid-state battery in which a plurality of unit cells are connected in series with an internal collection layer intervening therebetween can be obtained. By this, a layered solid-state battery of a high output can be obtained.

Also, in the layered solid-state battery of the present invention, the internal collection layer intervening between the first and second unit cells contains an ion-conductively insulating specific conductive material, so that two unit cells adjacent to each other can be electrically connected in series, and the positive electrode layer and the negative electrode layer can be ion-conductively insulated efficiently in two unit cells that are adjacent to each other. By this, high characteristics can be obtained.

Further, external collection members such as withdrawal tabs can be omitted, and the unit cells constituting the layered solid-state battery can be electrically connected in series, and the positive electrode layer and the negative electrode layer can be ion-conductively insulated efficiently. By this, a layered solid-state battery excellent in space utilization ratio and cost performance can be obtained.

In the layered solid-state battery of the present invention, the internal collection layer further contains an electron conductive material.

By adopting such a construction, the electron conductivity of the internal collection layer can be enhanced.

The electron conductive material preferably contains at least one selected from the group consisting of an electrically conductive oxide, a metal, and a carbon material.

In the layered solid-state battery of the present invention, the specific conductive material preferably has a structure similar to that of a solid electrolyte material contained in at least one layer selected from the positive electrode layer and the negative electrode layer.

By adopting such a construction, the shrinkage ratios of the positive electrode layer or the negative electrode layer, the solid electrolyte layer, and the internal collection layer can be made closer to each other. By this, generation of cracks or the like can be restrained in fabricating the layered solid-state battery by integral sintering.

Also, in the layered solid-state battery of the present invention, the solid electrolyte material and the specific conductive material preferably contain a compound containing lithium.

Further, in the layered solid-state battery of the present invention, the solid electrolyte material and the specific conductive material preferably contain a lithium-containing phosphoric acid compound.

By adopting such a construction, the layered solid-state battery can be fabricated densely by integral sintering.

In the layered solid-state battery of the present invention, the solid electrolyte material and the specific conductive material preferably contain a lithium-containing phosphoric acid compound having a NASICON structure.

In this case, the ion-conductively insulating specific conductive material can be prepared by using, as an ion-conductive solid electrolyte material, a composition of a lithium-containing phosphoric acid compound having a NASICON structure as a base and reducing the molar ratio of lithium.

The lithium-containing phosphoric acid compound having a NASICON structure contained in the specific conductive material is preferably represented by the chemical formula $Li_{1+x}M_xM'_{2-x}(PO_4)_3$ (in the chemical formula, x satisfies $0 \leq x \leq 1$; M is Al or Ga; and M' is one or more elements selected from the group consisting of Ti, Ge, and Zr). In this case, part of P may be replaced with B, Si, or the like in the chemical formula.

In the layered solid-state battery of the present invention, an active substance material contained in at least one layer selected from the positive electrode layer and the negative electrode layer, a solid electrolyte material contained in at least one layer selected from the positive electrode layer and the negative electrode layer, a solid electrolyte material contained in the solid electrolyte layer, and the specific conductive material contained in the internal collection layer preferably contain a lithium-containing phosphoric acid compound.

By adopting such a construction, the positive electrode layer or the negative electrode layer, the solid electrolyte layer, and the internal collection layer have a phosphoric acid skeleton in common, whereby a layered solid-state battery having a low resistance can be fabricated more densely by integral sintering.

Also, the layered solid-state battery of the present invention is a layered solid-state battery formed by stacking n pieces of unit cells each of which is constituted of a positive electrode layer, a solid electrolyte layer, and a negative electrode layer that are sequentially stacked, while disposing n−1 pieces of the internal collection layers between the n pieces of the unit cells, wherein external electrodes having electron conductivity are preferably disposed on a surface of the unit cells located on the first stage and on the n-th stage that is not adjacent to the internal collection layers. Further, the internal collection layers that are in contact with the positive electrode layers of the unit cells among n−1 pieces of the internal collection layers and the external electrodes that are in contact with the positive electrode layers of the unit cells are preferably connected to a positive electrode terminal, and the internal collection layers that are in contact with the negative electrode layers of the unit cells among n−1 pieces of the internal collection layers and the external electrodes that are in contact with the negative electrode layers of the unit cells are preferably connected to a negative electrode terminal.

The end surfaces of the unit cells located on the uppermost stage and on the lowermost stage of the layered solid-state battery need not be ion-conductively insulated, so that an ion-conductively insulating layer need not be necessarily disposed. Therefore, by disposing external electrodes having electron conductivity in the above-described manner, the electric resistance of the layered solid-state battery can be reduced.

Further, the layered solid-state battery of the present invention is a layered solid-state battery formed by forming m pieces of power-generating elements each by stacking n pieces of unit cells each of which is constituted of a positive electrode layer, a solid electrolyte layer, and a negative electrode layer that are sequentially stacked, while disposing n−1 pieces of the internal collection layers between the n pieces of the unit cells, and by disposing m−1 pieces of external electrodes between the m pieces of power-generating elements and stacking the m pieces of power-generating elements, and has the following characteristic features. Two of the power-generating elements that are adjacent to one of the external electrodes are stacked and electrically connected so that the positive electrode layer sides or the negative electrode layer sides of the unit cells are adjacent to both surfaces of the external electrode. External electrodes are disposed also on a surface of the power-generating elements located on the first stage and on the m-th stage that is not adjacent to the external electrodes. Further, the external electrodes having the same pole are electrically connected by an external collection member. By doing so, the layered solid-state battery of the present invention has a structure in which at least two of the power-generating elements are electrically connected in parallel.

In this manner, a layered solid-state battery in which m pieces of power-generating elements, each of which is constructed by connecting n pieces of unit cells in series, are connected in parallel can be constructed by stacking the power-generating elements, each of which is constructed by connecting n pieces of unit cells in series, through the intermediary of external electrodes intervening between the m pieces of power-generating elements and electrically connecting the external electrodes having the same pole by an external collection member. Therefore, a layered solid-state battery exhibiting m-multiple of capacity can be easily constructed as compared with a layered solid-state battery constructed by connecting n pieces of unit cells in series.

In the layered solid-state battery of the present invention, an electrically conductive material that forms the external electrode preferably contains at least one selected from an electrically conductive oxide and a metal.

As described above, according to the present invention, since different poles are disposed on the two sides of the internal collection layer, a bipolar layered solid-state battery in which a plurality of unit cells are connected in series with an internal collection layer intervening therebetween can be obtained. Also, with a simple construction, the plurality of unit cells constituting the layered solid-state battery can be connected in series, and the positive electrode layer and the negative electrode layer can be ion-conductively insulated in two unit cells that are adjacent to each other, so that a layered solid-state battery having high characteristics can be obtained.

DETAILED DESCRIPTION OF PREFERRED EMBODIMENTS OF THE INVENTION

Hereafter, embodiments of the present invention will be described with reference to the drawings.

(First Embodiment)

First, a layered body that forms a basic structure of a layered solid-state battery will be described as a first embodiment of the present invention. Here, in each of the later-described embodiments of the present invention, the planar shape of the layered body is not limited; however, description will be given assuming that the shape is generally a rectangular shape.

Figure 1:
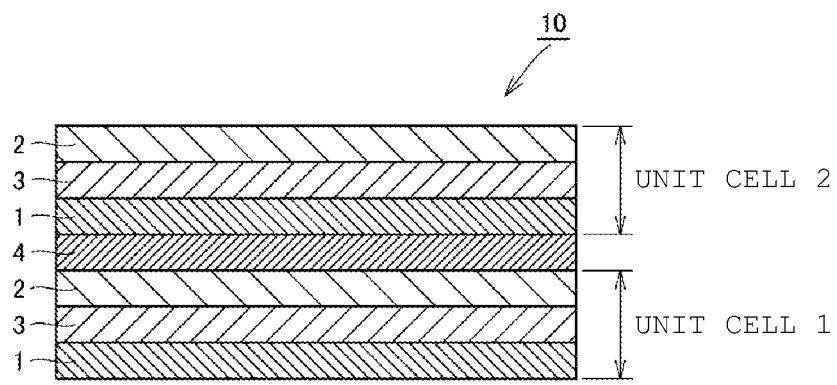
FIG. 1 is a cross-sectional view schematically illustrating a cross-sectional structure of a layered solid-state battery as a first embodiment of the present invention.

As illustrated in FIG. 1, in a layered solid-state battery 10, a (unit cell 1) and a (unit cell 2) are stacked with an internal collection layer 4 intervening therebetween. Each of the (unit cell 1) and the (unit cell 2) is constituted of a positive electrode layer 1, a solid electrolyte layer 3, and a negative electrode layer 2 that are sequentially stacked.

The (unit cell 1), the (unit cell 2), and the internal collection layer 4 are stacked so that the positive electrode layer 1 of the (unit cell 2) is adjacent to one side surface (the upper surface in FIG. 1) of the internal collection layer 4, and the negative electrode layer 2 of the (unit cell 1) is adjacent to the other side surface (the lower surface in FIG. 1) of the internal collection layer 4. The internal collection layer 4 contains at least an ion-conductively insulating specific conductive material.

In the layered solid-state battery 10 of the present invention constructed in the above-described manner, different poles are disposed on the two sides of the internal collection layer 4, so that a bipolar layered solid-state battery 10 in which a plurality of unit cells are connected in series with an internal collection layer 4 intervening therebetween can be obtained. By this, a layered solid-state battery 10 of a high output can be obtained.

Also, in the layered solid-state battery 10 of the present invention, the internal collection layer 4 intervening between the (unit cell 1) and the (unit cell 2) contains an ion-conductively insulating specific conductive material, so that two unit cells adjacent to each other can be electrically connected in series, and the positive electrode layer 1 and the negative electrode layers 2 can be ion-conductively insulated efficiently in adjacent two unit cells. By this, high characteristics can be obtained.

Further, external collection members such as withdrawal tabs can be omitted, and the unit cells constituting the layered solid-state battery 10 can be electrically connected in series, and the positive electrode layer 1 and the negative electrode layers 2 can be ion-conductively insulated efficiently. By this, a layered solid-state battery 10 excellent in space utilization ratio and cost performance can be obtained.

In the layered solid-state battery 10 constructed in the above-described manner, the internal collection layer 4 further contains an electron conductive material. Specifically, the internal collection layer 4 preferably contains at least one electron conductive material selected from the group consisting of an electrically conductive oxide, a metal, and a carbon material, and an ion-conductively electrically conductive specific conductive material. Here, nickel, copper, silver, and the like having a low electric resistance are particularly preferable for a metal used as the electron conductive material.

By adopting such a construction, the electron conductivity of the internal collection layer 4 can be enhanced.

As described above, by using an ion-conductively insulating material as the specific conductive material contained in the internal collection layer 4, the positive electrode layer 1 and the negative electrode layer 2 stacked with the internal collection layer 4 intervening therebetween can be ion-conductively insulated, and also by allowing an electron-conductive material to be contained in the internal collection layer 4, the positive electrode layer 1 and the negative electrode layer 2 stacked with the internal collection layer 4 intervening therebetween can be brought into electrical contact. By this, a layered solid-state battery 10 can be obtained in which two unit cells adjacent to the internal collection layer 4 are electrically connected in series without deteriorating the battery characteristics caused by electric discharge of ion-conducted positive electrode layer 1 and negative electrode layer 2.

Also, the specific conductive material preferably has a structure similar to that of a solid electrolyte material contained in at least one layer selected from the positive electrode layer 1 and the negative electrode layer 2.

By adopting such a construction, the shrinkage ratios of the positive electrode layer 1 or the negative electrode layer 2, the solid electrolyte layer 3, and the internal collection layer 4 can be made closer to each other. By this, generation of cracks or the like can be restrained in fabricating the layered solid-state battery 10 by integral sintering.

Further, the solid electrolyte material and the specific conductive material preferably contain a compound containing lithium. Furthermore, the solid electrolyte material and the specific conductive material preferably contain a lithium-containing phosphoric acid compound. In these cases, the solid electrolyte material and the specific conductive material need not be compounds having the same composition or the same composition ratio.

By adopting such a construction, the layered solid-state battery 10 can be fabricated densely by integral sintering. In particular, a dense layered body with improved close adhesion property of the positive electrode layer 1, the negative electrode layer 2, the solid electrolyte layer 3, and the internal collection layer 4 can be obtained without generation of exfoliation or cracks.

In the layered solid-state battery 10 of the present invention, the solid electrolyte material and the specific conductive material preferably contain a lithium-containing phosphoric acid compound having a NASICON structure. In this case, the solid electrolyte material and the specific conductive material need not be compounds having the same composition or the same composition ratio, and it is sufficient that these are compounds having similar structures.

In this case, the ion-conductively insulating specific conductive material can be prepared by using, as an ion-conductive solid electrolyte material, a composition of a lithium-containing phosphoric acid compound having a NASICON structure as a base and reducing the molar ratio of lithium.

The lithium-containing phosphoric acid compound having a NASICON structure contained in the specific conductive material is preferably represented by the chemical formula $Li_xM_y(PO_4)_3$ (in the chemical formula, x satisfies $1 \leq x \leq 2$; y satisfies $1 \leq y \leq 2$; and M is one or more elements selected from the group consisting of Ti, Ge, Al, Ga, and Zr). In this case, part of P may be replaced with B, Si, or the like in the aforementioned chemical formula.

As the lithium-containing phosphoric acid compound having a NASICON structure used in the solid electrolyte material and the specific conductive material, a mixture obtained by mixing two or more lithium-containing phosphoric acid compounds having a NASICON structure, each having a different composition from each other, such as $Li_{1.5}Al_{0.5}Ge_{1.5}(PO_4)_3$ and $Li_{1.2}Al_{0.2}Ti_{1.8}(PO_4)_3$ may be used, for example.

Also, as the lithium-containing phosphoric acid compound having a NASICON structure used in the solid electrolyte material and the specific conductive material, a compound containing a crystal phase of a lithium-containing phosphoric acid compound having a NASICON structure or glass that deposits a crystal phase of a lithium-containing phosphoric acid compound having a NASICON structure by heat treatment may be used.

Here, as a material used in the solid electrolyte material, a material having ion conductivity and having electron conductivity so small as to be ignorable can be used instead of the lithium-containing phosphoric acid compound having a NASICON structure. Examples of such a material can include lithium halide, lithium nitride, lithium oxygen acid salt, and derivatives thereof. Also, examples of such a material can include Li—P—O-based compounds such as lithium phosphate ($Li_3PO_4$), LIPON ($LiPO_{4-x}N_x$) obtained by mixing nitrogen with lithium phosphate, Li—Si—O-based compounds such as $Li_4SiO_4$, Li—P—Si—O-based compounds, Li—V—Si—O-based compounds, compounds having a Perovskite structure such as $La_{0.51}Li_{0.35}TiO_{2.94}$, $La_{0.55}Li_{0.35}TiO_3$, and $Li_{3x}La_{2/3-x}TiO_3$, and compounds having a garnet structure having Li, La, and Zr.

Examples of a material used in the ion-conductively insulating specific conductive material can include compounds having a Perovskite structure of a stoichiometric composition such as $(La_{1/2}Li_{1/2})TiO_3$ and the like, in addition to the one made to be an ion-conductively insulating material by using a composition of a lithium-containing phosphoric acid compound having an ion-conductive NASICON structure as a base and reducing the molar ratio of lithium.

In the layered solid-state battery 10 of the present invention, an active substance material contained in at least one layer of the positive electrode layer 1 and the negative electrode layer 2, a solid electrolyte material contained in at least one layer of the positive electrode layer 1 and the negative electrode layer 2, a solid electrolyte material contained in the solid electrolyte layer 3, and the specific conductive material contained in the internal collection layer 4 preferably contain a lithium-containing phosphoric acid compound.

By adopting such a construction, the positive electrode layer 1 or the negative electrode layer 2, the solid electrolyte layer 3, and the internal collection layer 4 have a phosphoric acid skeleton in common, whereby a layered solid-state battery 10 having a low resistance can be fabricated more densely by integral sintering.

Here, the type of the active substance material is not particularly limited; however, as a positive electrode active substance material, a lithium-containing phosphoric acid compound having a NASICON structure such as $Li_3V_2(PO_4)_3$, $LiFePO_4$, or $LiMnPO_4$, or a lithium-containing phosphoric acid compound having an olivine structure can be used. Also, a layer compound such as $LiCoO_2$ or $LiCo_{1/3}Ni_{1/3}Mn_{1/3}O_2$, a lithium-containing compound having a spinel structure such as $LiMn_2O_4$, $LiNi_{0.5}Mn_{1.5}O_4$, or $Li_4Ti_5O_{12}$, or a phosphoric acid compound such as $LiFePO_4$ or $LiMnPO_4$ can be used as the positive electrode active substance material. As a negative electrode active substance material, a graphite-lithium compound, a lithium alloy such as Li—Al, oxide such as $Li_3V_2(PO_4)_3$, $Li_3Fe_2(PO_4)_3$, or $Li_4Ti_5O_{12}$, or the like can be used.

The method for forming the internal collection layer 4 is not particularly limited; however, it may be carried out by preparing materials in a slurry form and stacking green sheets, by preparing materials in a paste form and performing screen printing, or the like. The method for molding the green sheets is not particularly limited; however, it may be carried out by using a die-coater, a comma-coater, the screen printing method, or the like. The method for stacking the green sheets is not particularly limited; however, it may be carried out by hot isostatic pressing (HIP), cold isostatic pressing (CIP), water isostatic pressing (WIP), or the like.

(Second Embodiment)

Next, as a second embodiment of the present invention, a layered solid-state battery having a layered solid-state battery 10 illustrated in FIG. 1 as a basic structure will be described.

Figure 2:
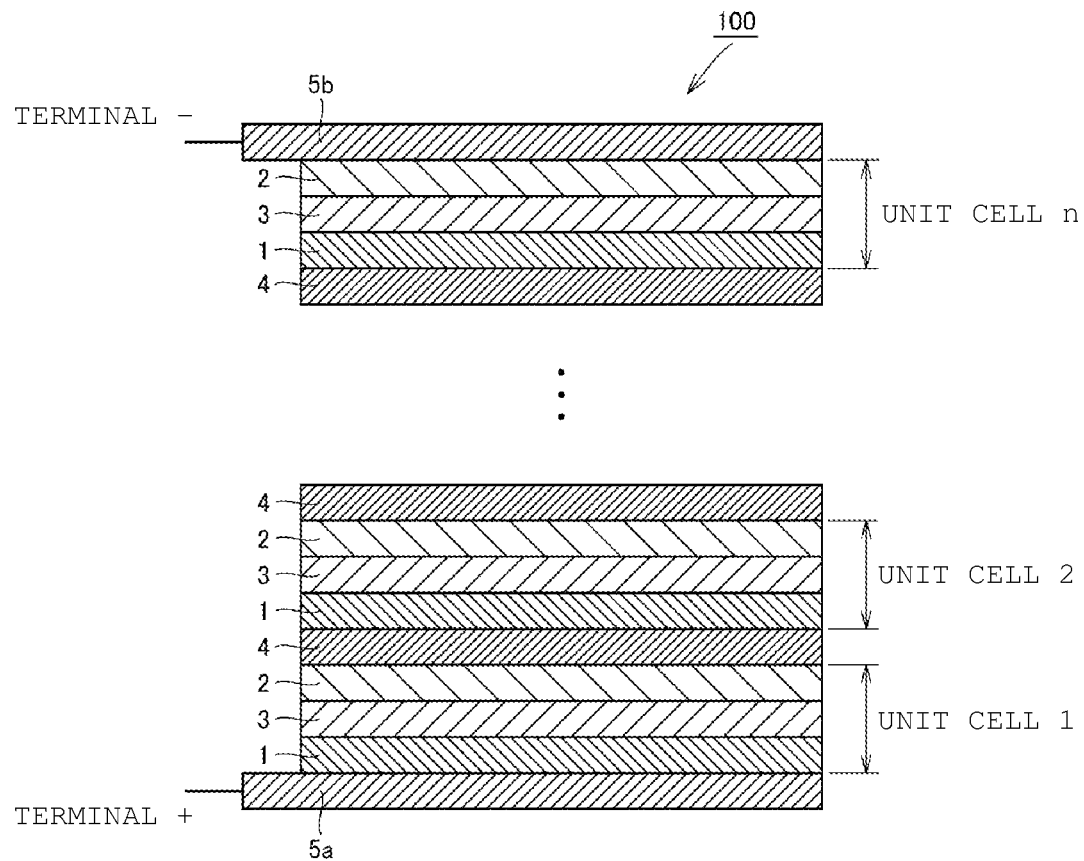
FIG. 2 is a cross-sectional view schematically illustrating a cross-sectional structure of a layered solid-state battery in the case where an even number of unit cells are provided as a second embodiment of the present invention.

As illustrated in FIG. 2, in the same manner as in FIG. 1, in a layered solid-state battery 100, n pieces of (unit cells 1 to n) are stacked with internal collection layers 4 intervening therebetween. In order that the positive electrode layers 1 (negative electrode layers 2) of the (unit cells 1 to n) are disposed on the same side in the stack direction, n pieces of (unit cells 1 to n) are stacked with n−1 pieces of internal collection layers 4 intervening therebetween. External electrodes 5a and 5b are disposed on the outside surfaces of the layered body formed by stacking n pieces of unit cells. Specifically, in the (unit cell 1) located on the lowermost stage which is one end of the layered body, an external electrode 5a having electron conductivity is disposed on the surface of the positive electrode layer 1 that is not adjacent to the solid electrolyte layer 3. In the (unit cell n) located on the uppermost stage which is the other end of the layered body, an external electrode 5b having electron conductivity is disposed on the surface of the negative electrode layer 2 that is not adjacent to the solid electrolyte layer 3. Charging and discharging are carried out by connecting the external electrode 5a to a positive electrode terminal and connecting the external electrode 5b to a negative electrode terminal.

In the layered solid-state battery 100 constructed as described above, by using an ion-conductively insulating material as the specific conductive material contained in the internal collection layer 4, the positive electrode layer 1 and the negative electrode layer 2 stacked with the internal collection layer 4 intervening therebetween can be ion-conductively insulated, and also by allowing an electron-conductive material to be contained in the internal collection layer 4, the positive electrode layer 1 and the negative electrode layer 2 stacked with the internal collection layer 4 intervening therebetween can be brought into electrical contact. By this, n pieces of unit cells constituting the layered solid-state battery 100 can be electrically connected in series without using external collection members such as withdrawal tabs, and also the positive electrode layer 1 and the negative electrode layer 2 can be ion-conductively insulated efficiently. By this, a layered solid-state battery 100 excellent in space utilization ratio and cost performance can be obtained.

Here, the method of constructing the layered solid-state battery 100 of the present embodiment is not particularly limited. For example, a method of first constructing (unit cells 1 to n) and internal collection layers 4 and sequentially stacking them so as to sandwich them with a pair of external electrodes 5a and 5b to form the layered solid-state battery 100, a method of sequentially stacking the positive electrode layer 1, the solid electrolyte layer 3, the negative electrode layer 2, and the internal collection layer 4 on the external electrode 5a and finally stacking the external electrode 5b to form the layered solid-state battery 100, or the like method may be adopted.

(Third Embodiment)

Next, a structure of a layered solid-state battery in which the layered solid-state battery 100 illustrated in FIG. 2 is applied will be described as the third embodiment of the present invention.

Figure 3:
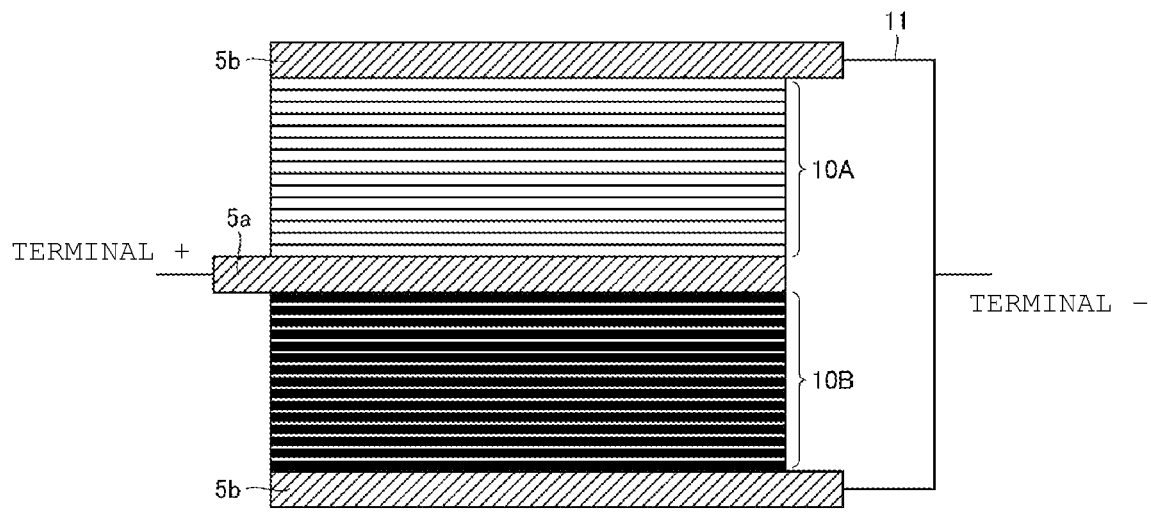
FIG. 3 is a cross-sectional view schematically illustrating a cross-sectional structure of a layered solid-state battery in the case where an odd number of unit cells are provided as a third embodiment of the present invention.
Figure 4:
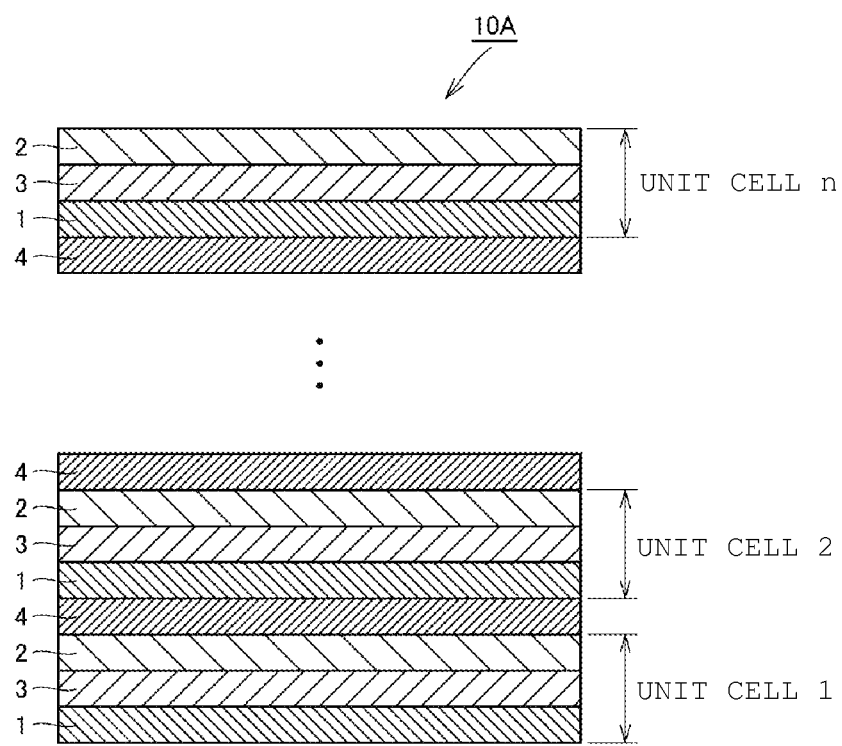
FIG. 4 is a cross-sectional view schematically illustrating a cross-sectional structure of a first power-generating element in a layered solid-state battery as the third embodiment of the present invention.
Figure 5:
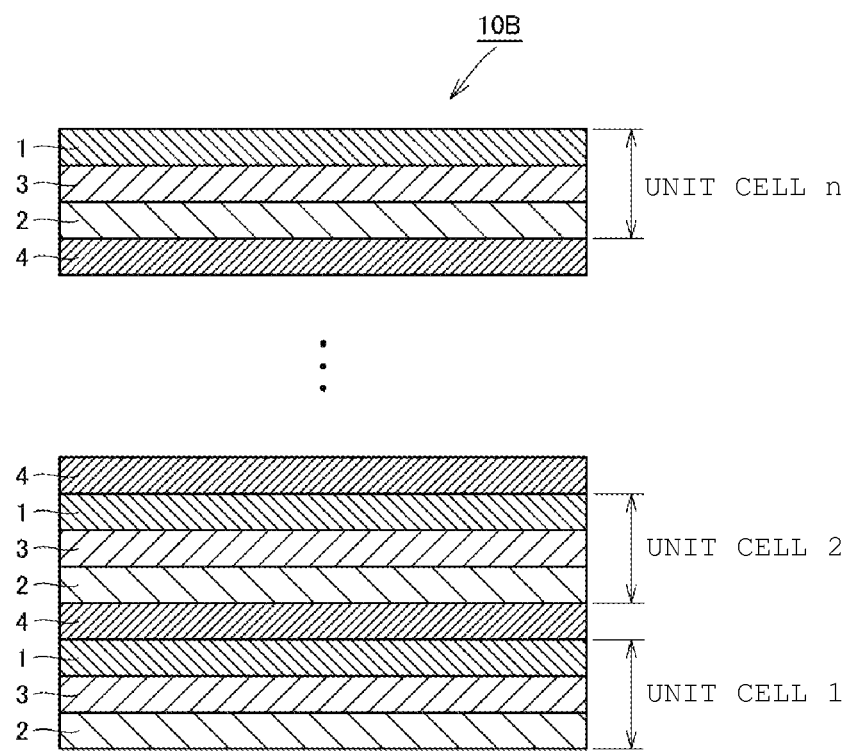
FIG. 5 is a cross-sectional view schematically illustrating a cross-sectional structure of a second power-generating element in a layered solid-state battery as the third embodiment of the present invention.

As illustrated in FIG. 3, the layered solid-state battery is constructed by stacking two power-generating elements 10A and 10B, each of which is constructed by connecting n pieces of unit cells in series, through the intermediary of an external electrode 5a and electrically connecting the two power-generating elements 10A and 10B in parallel. As illustrated in FIGS. 4 and 5, the two power-generating elements 10A and 10B are each constructed by stacking n pieces of (unit cells 1 to n) through the intermediary of n−1 pieces of internal collection layers 4. In other words, in each of the power-generating elements 10A and 10B, n pieces of unit cells are electrically connected in series in the same manner as in the layered solid-state battery 100 illustrated in FIG. 2.

As illustrated in FIGS. 3 to 5, the power-generating element 10A is formed as the first layered body by stacking n pieces of unit cells, and the power-generating element 10B is formed as the second layered body by stacking n pieces of unit cells. An external electrode 5a is disposed as the first external electrode between the positive electrode layer 1 positioned on one side surface of the power-generating element 10A and the positive electrode layer 1 positioned on one side surface of the power-generating element 10B. In other words, the positive electrode layers 1 are respectively adjacent to the two surfaces of the external electrode 5a that is present to intervene between the two power-generating elements 10A and 10B. An external electrode 5b is disposed as the second external electrode on the negative electrode layer 2 positioned on the other side surface of the power-generating element 10A. An external electrode 5b is disposed as the third external electrode on the negative electrode layer 2 positioned on the other side surface of the power-generating element 10B. In this manner, external electrodes 5b are disposed also on the surfaces located on the uppermost stage and on the lowermost stage which are ends of the layered body illustrated in FIG. 3. Further, the two external electrodes 5b and 5b are electrically connected through the intermediary of an external collection member 11. Therefore, the two power-generating elements 10A and 10B are electrically connected in parallel through the intermediary of the external electrodes 5a and 5b. Charging and discharging are carried out by connecting the external electrode 5a to a positive electrode terminal and connecting the external electrodes 5b to a negative electrode terminal.

In the layered solid-state battery constructed as described above, a double of the capacity can be exhibited with the same voltage as that of the layered solid-state battery 100 illustrated in FIG. 2 by electrically connecting in parallel two pieces of power-generating elements 10A and 10B, each of which is constructed by electrically connecting n pieces of (unit cells 1 to n) in series.

Here, in the present embodiment, a layered solid-state battery has been described which is constructed in such a manner that the positive electrode layers 1 are respectively adjacent to the two surfaces of the external electrode 5a that is present to intervene between the two power-generating elements 10A and 10B; however, the two power-generating elements 10A and 10B may be disposed so that the negative electrode layers 2 are adjacent.

Even in the layered solid-state battery illustrated in FIG. 3, functions and effects similar to those of the layered solid-state battery 100 illustrated in FIG. 2 can be obtained.

(Fourth Embodiment)

Finally, a modification of the third embodiment, which is a structure of a layered solid-state battery in which the layered solid-state battery 100 illustrated in FIG. 2 is applied, will be described as the fourth embodiment of the present invention.

Figure 6:
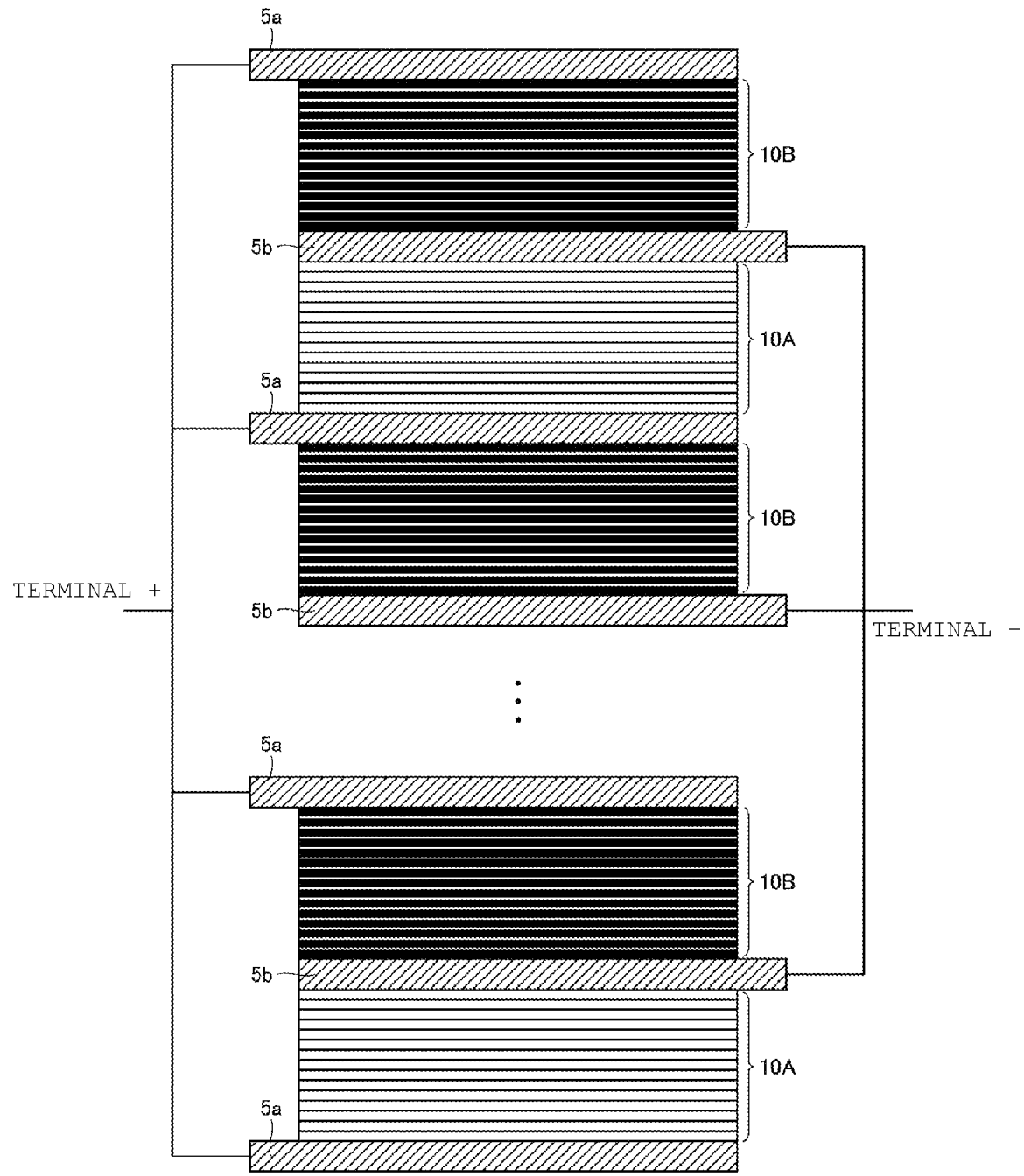
FIG. 6 is a cross-sectional view schematically illustrating a cross-sectional structure of a layered solid-state battery in the case where an even number of power-generating elements are provided as a fourth embodiment of the present invention.
Figure 7:
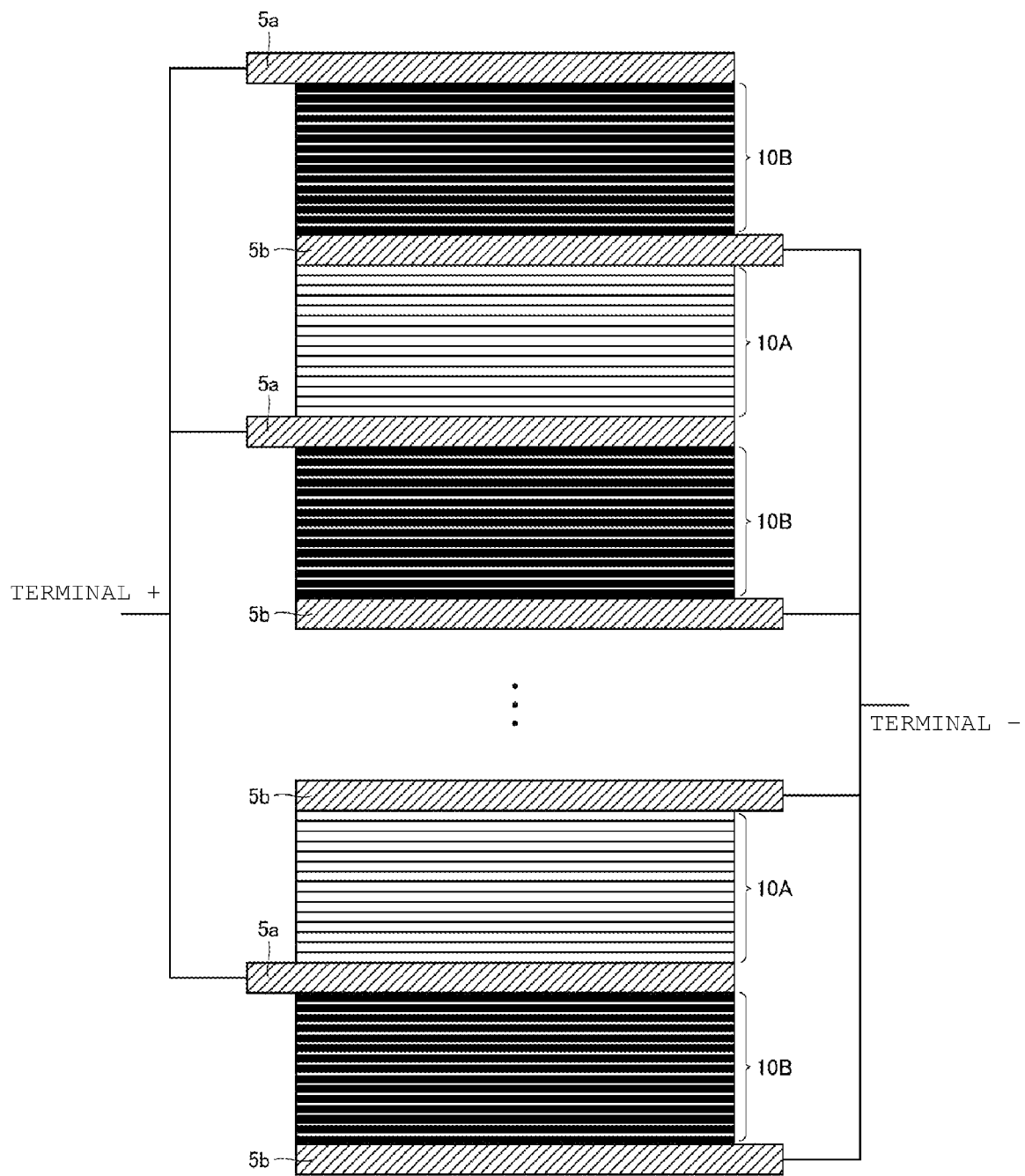
FIG. 7 is a cross-sectional view schematically illustrating a cross-sectional structure of a layered solid-state battery in the case where an odd number of power-generating elements are provided as a fourth embodiment of the present invention.

As illustrated in FIGS. 6 to 7, the layered solid-state battery is constructed by stacking a plurality of power-generating elements 10A and 10B, each of which is constructed by connecting n pieces of unit cells in series, through the intermediary of an external electrode 5a or an external electrode 5b intervening between two power-generating elements 10A and 10B that are adjacent to each other and electrically connecting the plurality of power-generating elements 10A and 10B in parallel. FIG. 6 illustrates a cross-sectional structure of the layered solid-state battery in the case where an even number of power-generating elements are provided. FIG. 7 illustrates a cross-sectional structure of a layered solid-state battery in the case where an odd number of power-generating elements are provided. The two power-generating elements 10A and 10B are each constructed by stacking n pieces of (unit cells 1 to n) through the intermediary of n−1 pieces of internal collection layers 4. In other words, in each of the power-generating elements 10A and 10B, n pieces of unit cells are electrically connected in series in the same manner as in the layered solid-state battery 100 illustrated in FIG. 2.

An external electrode 5a is disposed as the first external electrode between the positive electrode layer 1 positioned on one side surface of the power-generating element 10A and the positive electrode layer 1 positioned on one side surface of the power-generating element 10B. Also, an external electrode 5b is disposed as the first external electrode between the negative electrode layer 2 positioned on one side surface of the power-generating element 10A and the negative electrode layer 2 positioned on one side surface of the power-generating element 10B. In other words, the positive electrode layers 1 are respectively adjacent to the two surfaces of the external electrode 5a that is present to intervene between the two power-generating elements 10A and 10B. The negative electrode layers 1 are respectively adjacent to the two surfaces of the external electrode 5b that is present to intervene between the two power-generating elements 10A and 10B.

Also, an external electrode 5a or an external electrode 5b is disposed on the surfaces located on the uppermost stage and on the lowermost stage which are ends of the layered body illustrated in FIGS. 6 and 7. Further, the plurality of external electrodes 5a and 5a and the plurality of external electrodes 5b and 5b are electrically connected. Therefore, the plurality of power-generating elements 10A and 10B are electrically connected in parallel through the intermediary of the external electrodes 5a and 5b. Charging and discharging are carried out by connecting the external electrodes 5a to a positive electrode terminal and connecting the external electrodes 5b to a negative electrode terminal.

In the layered solid-state battery constructed as described above, m-multiple, that is, an even number multiple or an odd number multiple, of the capacity can be exhibited with the same voltage as that of the layered solid-state battery 100 illustrated in FIG. 2 by electrically connecting in parallel m pieces, that is, an even number or an odd number, of power-generating elements 10A and 10B, each of which is constructed by electrically connecting n pieces of (unit cells 1 to n) in series.

Even in the layered solid-state battery illustrated in FIGS. 6 and 7, functions and effects similar to those of the layered solid-state battery 100 illustrated in FIG. 2 can be obtained.

Here, in each of the layered solid-state batteries according to the first to fourth embodiments, each constituent element can be realized by using the materials shown below.

The solid electrolyte layer 3 contains the solid electrolyte material as a main material.

The positive electrode layer 1 contains a mixture of the positive electrode active substance material and the solid electrolyte material as a main material. Also, the positive electrode layer 1 may contain a small amount of carbon or the like as an electrically conductive agent.

The negative electrode layer 2 contains a mixture of the negative electrode active substance material and the solid electrolyte material as a main material. Also, the negative electrode layer 2 may contain a small amount of carbon or the like as an electrically conductive agent.

EXAMPLES

Hereafter, Examples of the present invention will be described.

An Example in which a layered solid-state battery according to the second embodiment of the present invention was actually fabricated will be described.

<Synthesis of Active Substance Powder>

Active substance powder including a lithium-containing vanadium phosphoric acid compound ($Li_3V_2(PO_4)_3$) (hereafter referred to as LVP) as an active substance material and carbon powder as an electrically conductive agent was synthesized by the following procedure.

(1) The powders of $Li_2CO_3$, $V_2O_5$, and $(NH_4)_2H(PO_4)_3$ as raw materials were mixed in a mortar so as to attain a stoichiometric ratio of LVP.

(2) The obtained mixed powder was fired at a temperature of 600° C. for 10 hours in an air atmosphere.

(3) To the obtained fired powder, carbon powder as an electrically conductive material was added and mixed in a mortar.

(4) The obtained mixed powder was fired at a temperature of 950° C. for 10 hours in an argon gas atmosphere.

<Preparation of Sheet for Positive and Negative Electrode Layers, Sheet for Solid Electrolyte Layer, and Sheet for Internal Collection Layer>

Crystal powder of NASICON aluminum-substituted germanium lithium phosphate ($Li_{1.5}Al_{0.5}Ge_{1.5}(PO_4)_3$) (hereafter referred to as LAGP) as a solid electrolyte material and a binder solution obtained by dissolving polyvinyl alcohol as a binder into toluene were mixed to obtain a slurry for a solid electrolyte layer. The blending ratio was set to be LAGP:polyvinyl alcohol=70:30 in a mass ratio.

Mixed powder obtained by mixing 50 parts by mass of crystal powder of LAGP as a solid electrolyte material, 45 parts by mass of the active substance powder obtained in the above, and 5 parts by mass of carbon powder as an electrically conductive agent in a mortar was used as a main material, and this main material and a binder solution obtained by dissolving polyvinyl alcohol as a binder into toluene were mixed to prepare a slurry for a positive electrode layer and a slurry for a negative electrode layer, which were made of the same material. The blending ratio was set to be main material:polyvinyl alcohol=70:30 as a mass ratio.

As the specific conductive material contained in the internal collection layer, a compound obtained by using a composition of a lithium-containing phosphoric acid compound having an ion-conductive NASICON structure as a base and reducing the molar ratio of lithium was adopted. Specifically, a mixed powder obtained by mixing 50 parts by mass of crystal powder of a lithium-germanium-containing NASICON compound represented by a compositional formula of $LiGe_2(PO_4)_3$ as a specific conductive material and 50 parts by mass of carbon powder as an electrically conductive agent in a mortar was used as a main material, and this main material and a binder solution obtained by dissolving polyvinyl alcohol as a binder into toluene were mixed to prepare a slurry for an internal collection layer. The blending ratio was set to be principal material:polyvinyl alcohol=70:30 as a mass ratio.

The slurry for a positive electrode layer, the slurry for a negative electrode layer, the slurry for a solid electrolyte layer, and the slurry for an internal collection layer prepared in the above-described manner were molded to a thickness of 50 μm by using a doctor blade, thereby to prepare a sheet for a positive electrode layer, a sheet for a negative electrode layer, a sheet for a solid electrolyte layer, and a sheet for an internal collection layer.

<Fabrication of Layered Solid-State Battery>

The sheet for the positive electrode layer 1, the sheet for the negative electrode layer 2, the sheet for the solid electrolyte layer 3, and the sheet for the internal collection layer 4 that had been stamped out into a circular disk shape having a diameter of 12 mm were stacked with a construction of a laminated body such as illustrated in FIG. 1, and were thermally press-bonded at a temperature of 60° C. under a pressure of 1 ton, thereby to obtain a laminated body for the layered solid-state battery 10. Here, the positive electrode layer 1 was constructed by one sheet of the positive electrode layer, and the negative electrode layer 2 was constructed by two sheets of the negative electrode layers.

Figure 8:
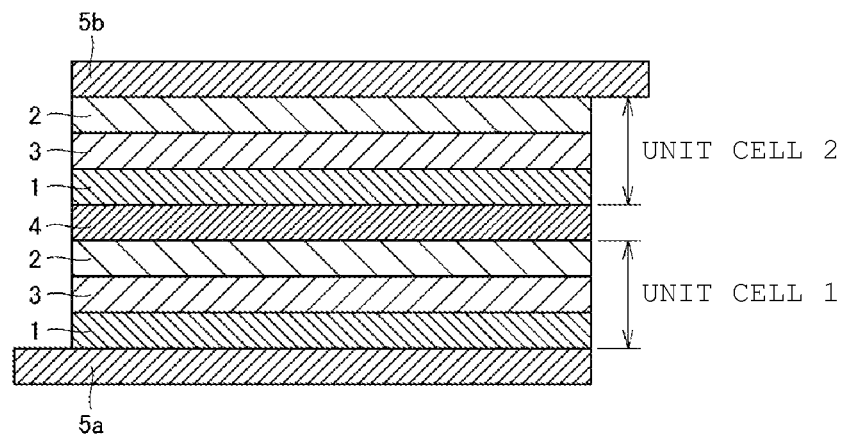
FIG. 8 is a cross-sectional view schematically illustrating a cross-sectional structure of a layered solid-state battery fabricated in the Example of the present invention.

As the sheets for the external electrodes 5a, 5b illustrated in FIG. 8, the same sheets as those for the internal collection layer 4 were used, and the sheets for the external electrodes 5a, 5b were stacked respectively onto the surfaces of the (unit cell 1) and the (unit cell 2) that are not adjacent to the internal collection layer 4.

The layered body for a solid-state battery obtained in the above-described manner was sandwiched between two sheets of ceramics plates made of alumina, fired at a temperature of 500° C. for 2 hours in an oxygen gas atmosphere to remove polyvinyl alcohol, and thereafter fired at a temperature of 700° C. for 2 hours in a nitrogen gas atmosphere, thereby to perform sinter-bonding of the positive electrode layer 1, the negative electrode layer 2, the solid electrolyte layer 3, the internal collection layer 4, and the external electrodes 5a, 5b, whereby the layered solid-state battery illustrated in FIG. 8 was obtained.

Further, in order to collect electricity efficiently, a platinum layer was formed by sputtering on the outside of the external electrodes 5a, 5b of the layered solid-state battery illustrated in FIG. 8.

Thereafter, the layered solid-state battery was dried at a temperature of 100° C. and then sealed with a coin cell of 2032 type.

<Evaluation of Solid-State Battery>

Figure 9:
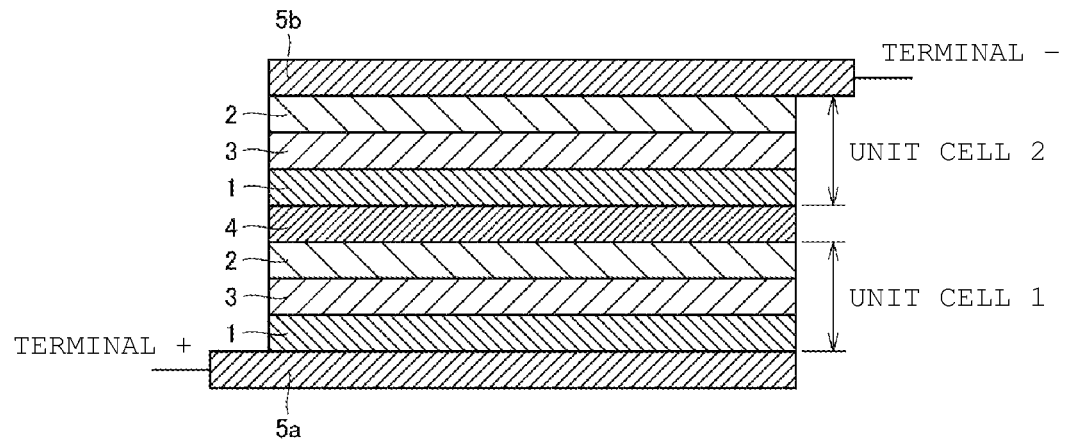
FIG. 9 is a cross-sectional view schematically illustrating a cross-sectional structure of a layered solid-state battery equipped with an external terminal, fabricated in the Example of the present invention.

As illustrated in FIG. 9, the external electrode 5a was connected to a positive electrode terminal, and the external electrode 5b was connected to a negative electrode terminal, so as to perform charging and discharging. As a result of performing constant-current constant-voltage charging/discharging measurements of the layered solid-state battery illustrated in FIG. 9 in a voltage range of 0 to 3 V and at a current density of 200 µA/cm$^2$, it has been confirmed that charging and discharging can be carried out.

Here, in the present Example, crystal powder of LAGP was used as the solid electrolyte material; however, similar effects can be obtained even when non-crystalline powder of LAGP is used.

Also, in the present Example, description has been given only on the case in which LVP is used as a negative electrode active substance; however, similar effects can be obtained even when a graphite-lithium compound, a lithium alloy such as Li—Al, or oxide such as $Li_3V_2(PO_4)_3$, $Li_3Fe_2(PO_4)_3$, or $Li_4Ti_5O_{12}$ is used as the negative electrode active substance.

It is to be considered that the embodiments and Examples disclosed herein are exemplifications in all respects and are not limitative. The scope of the present invention is shown not by the above embodiments but by the claims, and it is intended that all corrections and modifications equivalent to or within the scope of the claims are comprised therein.

According to the layered solid-state battery of the present invention, a bipolar layered solid-state battery in which a plurality of unit cells are connected in series with an internal collection layer intervening therebetween can be obtained. Also, the plurality of unit cells constituting the layered solid-state battery can be connected in series, and the positive electrode layer and the negative electrode layer can be ion-conductively insulated in two unit cells that are adjacent to each other, so that a layered solid-state battery having high characteristics can be obtained.

DESCRIPTION OF REFERENCE SYMBOLS

1: positive electrode layer
2: negative electrode layer
3: solid electrolyte layer
4: internal collection layer
10, 100: layered solid-state battery

The invention claimed is:

1. A layered solid-state battery comprising:
at least first and second unit cells each of which includes a positive electrode layer, a solid electrolyte layer, and a negative electrode layer that are sequentially stacked; and
an internal collection layer disposed such that a first side surface thereof is in contact with the positive electrode layer of the first unit cell and a second side surface thereof is in contact with the negative electrode layer of the second unit cell so as to intervene between the first and second unit cells,
wherein the internal collection layer contains an electron conductive material and an ion-conductively insulating specific conductive material,
wherein the ion-conductively insulating specific conductive material has a structure similar to that of a solid electrolyte material contained in at least one layer selected from the positive electrode layer and the negative electrode layer, and
wherein the ion-conductively insulating specific conductive material contains a lithium-containing phosphoric acid compound having a NASICON structure.

2. The layered solid-state battery according to claim 1, wherein the electron conductive material contains at least one material selected from the group consisting of an electrically conductive oxide, a metal, and a carbon material.

3. The layered solid-state battery according to claim 1, wherein the solid electrolyte material also contains the lithium-containing phosphoric acid compound having a NASICON structure.

4. The layered solid-state battery according to claim 1, wherein the lithium-containing phosphoric acid compound having a NASICON structure contained in the ion-conductively insulating specific conductive material is represented by $Li_{1+x}M_xM'_{2-x}(PO_4)_3$, wherein x satisfies $0 \leq x \leq 1$; M is Al or Ga; and M' is one or more elements selected from the group consisting of Ti, Ge, and Zr.

5. The layered solid-state battery according to claim 1, wherein an active substance material contained in at least one layer selected from the positive electrode layer and the negative electrode layer, a solid electrolyte material contained in at least one layer selected from the positive electrode layer and the negative electrode layer, a solid electrolyte material contained in the solid electrolyte layer, and the ion-conductively insulating specific conductive material contained in the internal collection layer contain a lithium-containing phosphoric acid compound.

6. A layered solid-state battery comprising:
- n pieces of stacked unit cells each of which includes a positive electrode layer, a solid electrolyte layer, and a negative electrode layer that are sequentially stacked;
- n−1 pieces of internal collection layers between the n pieces of the unit cells, each of the n−1 pieces of the internal collection layers being disposed such that a first side surface thereof is in contact with the positive electrode layer and a second side surface thereof is in contact with the negative electrode layer of adjacent unit cell of the n pieces of unit cells; and
- external electrodes having electron conductivity on a surface that is not adjacent to the internal collection layer of a first stage unit cell of the n pieces of stacked unit cells and on a surface that is not adjacent to the internal collection layer of an n-th stage unit cell of the n pieces of stacked unit cells,
- wherein the internal collection layers contains an electron conductive material and an ion-conductively insulating specific conductive material,
- wherein the ion-conductively insulating specific conductive material has a structure similar to that of a solid electrolyte material contained in at least one layer selected from the positive electrode layer and the negative electrode layer, and
- wherein the ion-conductively insulating specific conductive material contains a lithium-containing phosphoric acid compound having a NASICON structure.

7. The layered solid-state battery according to claim 6, wherein the electron conductive material contains at least one material selected from the group consisting of an electrically conductive oxide, a metal, and a carbon material.

8. The layered solid-state battery according to claim 6, wherein the solid electrolyte material also contains the lithium-containing phosphoric acid compound having a NASICON structure.

9. The layered solid-state battery according to claim 6, wherein the lithium-containing phosphoric acid compound having a NASICON structure contained in the ion-conductively insulating specific conductive material is represented by $Li_{1+x}M_xM'_{2-x}(PO_4)_3$, wherein x satisfies $0 \leq x \leq 1$; M is Al or Ga; and M' is one or more elements selected from the group consisting of Ti, Ge, and Zr.

10. The layered solid-state battery according to claim 6, wherein an active substance material contained in at least one layer selected from the positive electrode layer and the negative electrode layer, a solid electrolyte material contained in at least one layer selected from the positive electrode layer and the negative electrode layer, a solid electrolyte material contained in the solid electrolyte layer, and the ion-conductively insulating specific conductive material contained in the internal collection layer contain a lithium-containing phosphoric acid compound.

11. The layered solid-state battery according to claim 6, wherein an electrically conductive material of the external electrode contains at least one material selected from an electrically conductive oxide and a metal.

12. A layered solid-state secondary battery comprising:
m pieces of stacked power-generating elements, each of the m pieces of stacked power-generating elements comprising:
- n pieces of stacked unit cells each of which includes a positive electrode layer, a solid electrolyte layer, and a negative electrode layer that are sequentially stacked;
- n−1 pieces of internal collection layers between the n pieces of the unit cells, each of the n−1 pieces of the internal collection layers being disposed such that a first side surface thereof is in contact with the positive electrode layer and a second side surface thereof is in contact with the negative electrode layer of adjacent unit cell of the n pieces of unit cells,
- wherein the internal collection layers contains an electron conductive material and an ion-conductively insulating specific conductive material;
- m−1 pieces of intervening electrodes between the m pieces of power-generating elements;
- external electrodes disposed on a surface of the power-generating elements located on a first stage and on an m-th stage that is not adjacent to the m−1 pieces of intervening electrodes, wherein
- each of the power-generating elements that are adjacent to an intervening electrode of the m−1 pieces of intervening electrodes are electrically connected so that the positive electrode layer sides or the negative electrode layer sides of the unit cells of the power generating elements are adjacent to opposed surfaces of the intervening electrode,
- the external electrodes and intervening electrodes having the same pole are electrically connected such that at least two of the power-generating elements are electrically connected in parallel,
- the ion-conductively insulating specific conductive material has a structure similar to that of a solid electrolyte material contained in at least one layer selected from the positive electrode layer and the negative electrode layer, and
- the ion-conductively insulating specific conductive material contains a lithium-containing phosphoric acid compound having a NASICON structure.

13. The layered solid-state battery according to claim 12, wherein an electrically conductive material of the external electrode contains at least one material selected from an electrically conductive oxide and a metal.

* * * * *